(12) United States Patent
Itoga et al.

(10) Patent No.: US 7,852,716 B2
(45) Date of Patent: Dec. 14, 2010

(54) OPTICAL DISK DRAWING APPARATUS, OPTICAL DISK DRAWING SYSTEM AND OPTICAL DISK DRAWING METHOD

(75) Inventors: Hisanori Itoga, Hamamatsu (JP); Tatsuo Fushiki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 374 days.

(21) Appl. No.: 11/874,593

(22) Filed: Oct. 18, 2007

(65) Prior Publication Data
US 2008/0094955 A1    Apr. 24, 2008

(30) Foreign Application Priority Data
Oct. 18, 2006    (JP)    ............... 2006-283592

(51) Int. Cl.
    *G11B 7/00* (2006.01)
(52) U.S. Cl. ............... 369/44.29; 369/44.35; 369/53.28
(58) Field of Classification Search ............. 369/44.29, 369/44.35, 44.36, 44.27, 44.25, 53.28; 347/262, 347/264
    See application file for complete search history.

(56) References Cited

U.S. PATENT DOCUMENTS

| | | | | |
|---|---|---|---|---|
| 7,224,646 | B2 * | 5/2007 | Morishima | ................. 347/253 |
| 2002/0191517 | A1 | 12/2002 | Honda et al. | |
| 2004/0071454 | A1 | 4/2004 | Nishizawa | |
| 2004/0136291 | A1 * | 7/2004 | Hayashi | .................... 369/53.2 |
| 2004/0224041 | A1 | 11/2004 | Morishima | |
| 2005/0265208 | A1 | 12/2005 | Nakane et al. | |
| 2007/0201326 | A1 * | 8/2007 | Wei et al. | ................. 369/44.35 |
| 2007/0274174 | A1 * | 11/2007 | Kosaki | ................... 369/44.36 |
| 2009/0147631 | A1 * | 6/2009 | Yamada et al. | .......... 369/44.23 |

FOREIGN PATENT DOCUMENTS

| | | |
|---|---|---|
| EP | 1 143 426 A2 | 10/2001 |
| EP | 1 950 744 A1 | 7/2008 |
| EP | 1 950 745 A1 | 7/2008 |
| JP | 2002-203321 A | 7/2002 |
| JP | 2002-288848 A | 10/2002 |
| JP | 2004-39013 A | 2/2004 |
| JP | 2005-228382 A | 8/2005 |
| JP | 2005-339652 A | 12/2005 |
| JP | 2007-102857 A | 4/2007 |

OTHER PUBLICATIONS

English translation of Japanese Office Action dated May 22, 2009 (Four (4) pages).
European Search Report dated Dec. 29, 2008 (eight (8) pages).
Japanese Office Action dated Sep. 24, 2008 with English translation (Five (5) pages).

* cited by examiner

*Primary Examiner*—Thang V Tran
(74) *Attorney, Agent, or Firm*—Crowell & Moring LLP (57) ABSTRACT

In the optical disk drawing apparatus of the present invention, an automatic adjusting area where the drawing operation is not carried out is provided in the optical disk, laser light is irradiated onto the formed automatic adjusting area so as to control the focus servo gain, so that a stable focus servo control can be carried out.

10 Claims, 5 Drawing Sheets

OPTICAL DISK DRAWING APPARATUS, OPTICAL DISK DRAWING SYSTEM AND OPTICAL DISK DRAWING METHOD

BACKGROUND OF THE INVENTION

The present invention is related to a technique for drawing an image on a label surface side of an optical disk.

In the case that drawing operations are carried out with respect to optical disks, methods for drawing the optical disks by performing focus servo controls have been known. However, the drawing operation may become unstable in a certain case that a stable servo system cannot be established due to fluctuations in reflectance factors of respective optical disks, characteristic fluctuations in actuators, fluctuations in laser light amounts, temperature changes, and the like. Under such a circumstance, the following technical ideas have been developed (refer to, for example, JP-A-2002-203321 and JP-A-2005-228382): That is, a focus servo gain control is carried out just after an optical disk is inserted, so that the servo system is adjusted to optimum condition based upon reflection light of laser light irradiated on to the optical disk; and after drawing operations are commenced, the focus servo control is carried out based upon the above-described adjustment.

On the other hand, as to the optical disk on which the drawing operation has been once carried out, reflectance factors of a portion on the optical disk where the drawing operation has been performed are changed, but there are some possibilities that additional drawing operations are wanted to be carried out. In this case, in order to perform the focus gain control which is required before the additional drawing operation is carried out, the irradiation of the laser light for the focus gain control must be performed in an area of the optical disk in which the reflectance factors are slightly changed. As a consequence, it is necessary to judge whether a position of the optical disk where the laser light is to be irradiated corresponds to a recorded area, or an unrecorded area. Generally speaking, in the case of such an optical disk on which data has been recorded, since it is possible to judge whether a position of the optical disk on which laser light is to be irradiated corresponds to a data-recorded area, or a data-unrecorded area, a focus servo gain can be controlled by judging the data-unrecorded area.

On the other hand, in the case of such an optical disk where an image has been drawn, an area of the drawn image includes a plenty of portions where lines have been written and a plenty of portions where lines have not been written. As a result, when a label surface of the optical disk where the image has been drawn is scanned, the portions which are not physically written and the portions where the lines have been written are alternately and frequently switched. As a result, the focus servo gain cannot be controlled in a correct manner.

SUMMARY OF THE INVENTION

The present invention has been made by considering the above-described problems, and therefore, an object to provide an optical disk drawing apparatus, an optical disk drawing system and an optical disk drawing method capable of drawing an image on the label surface side of an optical disk in an optimum focus servo gain even in the case that the optical disk which has already been drawn on the label surface side thereof.

To solve the above-described problems, (1) An optical disk drawing apparatus for drawing an image on a drawing layer formed in an optical disk, the apparatus comprising;
a rotating unit that rotates the optical disk;
an optical pickup that irradiates laser light onto the optical disk and produces a light reception signal based on reflection light reflected from the optical disk;
a feeding unit that relatively moves the optical pickup with respect to the optical disk;
a focus servo controller that sets a focus servo gain, controls a gain of a signal produced based on the light reception signal according to the set focus servo gain and perform a focus servo control so that a focal point of the laser light output from the optical pickup is focused on the drawing layer based on the gain-controlled signal;
a judging unit that detects a position of the optical pickup moved by the feeding unit and judges whether or not an irradiation position of the laser light from the optical pickup is located within a predetermined area on the optical disk; and
a drawing controller that causes the focus servo control to set the focus servo gain when a judgment result made by the judging unit is positive, and permit a drawing operation of irradiating the laser light onto the drawing layer to form the image on the drawing layer when the focus servo gain has been set by the focus servo controller and the judgment result made by the judging unit is negative.

(2) The apparatus according to (1), wherein the judging unit stores area data indicative of the predetermined area, and compares the stored area data and the detected position of the optical pickup for the judging operation.

(3) The apparatus according to (1), wherein
the judging unit includes a reception unit that receives area data indicative of the predetermined area, and
the judging unit compares the area data received by the reception unit and the detected position of the optical pickup for the judging operation.

(4) The apparatus according to (1), wherein
the judging unit includes a readout unit that reads area data indicative of the predetermined area from the light reception signal output by the optical pickup; and
the judging unit compares the area data read by the readout unit and the detected position of the optical pickup for the judging operation.

(5) The apparatus according to (1) further comprising:
a storage that stores drawing data indicative of the image;
a drawing judging unit that judges whether or not the image data is to be drawn in the predetermined area of the optical disk; and
a rewriting unit that corrects the image data so that the corrected image data is not drawn in the predetermined area when a judgment result made by the drawing judging unit is positive.

(6) A method of drawing an image on a drawing layer formed in an optical disk, the method comprising:
rotating the optical disk;
irradiating laser light onto the optical disk to produce a light reception signal based on reflection light reflected from the optical disk;
first relatively moving the optical pickup with respect to the optical disk so that an irradiation position of the laser light from the optical pickup is located within a predetermined area on the optical disk;
after the first moving, setting a servo control gain;

after the setting, second relatively moving the optical pickup with respect to the optical disk so that the irradiation position of the laser light from the optical pickup is not located within the predetermined area on the optical disk;

after the second moving, controlling a gain of a signal produced based on the light reception signal according to the set focus servo gain and performing a focus servo control so that a focal point of the laser light output from the optical pickup is focused on the drawing layer based on the gain-controlled signal;

after the controlling, permitting a drawing operation of irradiating the laser light onto the drawing layer to form the image on the drawing layer.

(7) An optical disk drawing system comprising:

an optical disk including a drawing layer in which an image is to be drawn;

a rotating unit that rotates the optical disk;

an optical pickup that irradiates laser light onto the optical disk and produces a light reception signal based on reflection light reflected from the optical disk;

a feeding unit that relatively moves the optical pickup with respect to the optical disk;

a focus servo controller that sets a focus servo gain, controls a gain of a signal produced based on the light reception signal according to the set focus servo gain, and performs a focus servo control so that a focal point of the laser light output from the optical pickup is focused on the drawing layer based on the gain-controlled signal;

a judging unit that detects a position of the optical pickup moved by the feeding unit and judges whether or not an irradiation position of the laser light from the optical pickup is located within a predetermined area on the optical disk; and a drawing controller that causes the focus servo control to control the focus servo gain when a judgment result made by the judging unit is positive, and permit a drawing operation of irradiating the laser light onto the drawing layer to form the image when the focus servo gain has been set by the focus servo controller and the judgment result made by the judging unit is negative, (8) The system according to (7), wherein
the optical disk includes an automatic adjusting area as the predetermined area of the optical disk and a drawing area where the image is drawn, and
a structure of the automatic adjusting area is identical to a structure of the drawing area.

(9) The system according to (8), wherein
the optical disk includes a data recording layer for recording data,
a groove is formed on the data recording layer, (10) The system according to (9) further comprising a tracking servo that performs a tracking servo control is performed for the data recording layer having the groove when the data is recorded in the data recording layer, and does not perform the tracking servo control for the drawing layer having no groove when the image is drawn in the drawing layer.

In accordance with the present invention, even with respect to such an optical disk which has been drawn on the label surface side thereof, it is possible to provide the optical disk drawing apparatus capable of drawing on the label surface side thereof in the optimum focus servo gain.

DETAILED DESCRIPTION OF PREFERRED EMBODIMENTS

Next, a description is made of an embodiment according to the present invention.

Embodiment

An optical disk drawing apparatus 1 according to the present embodiment has a function capable of drawing an image on a label surface side of an optical disk 100 thereby a user can visually recognize the drawn image. In the following description, the optical disk 100 is firstly described, and thereafter, the optical disk drawing apparatus 1 is described.

Figure 1:
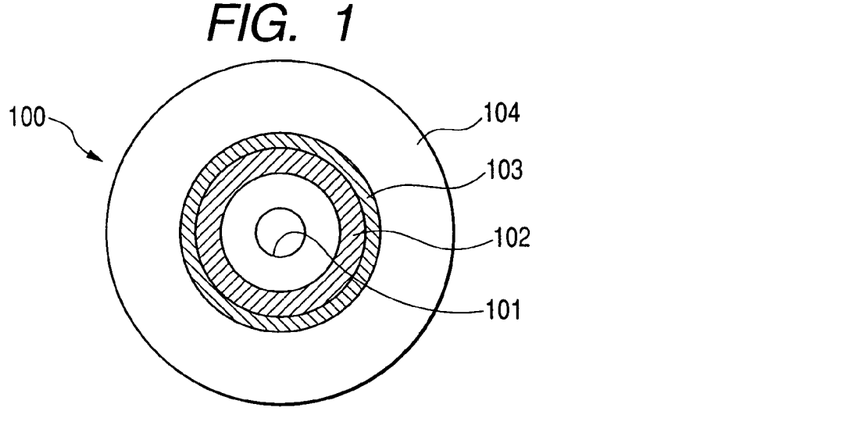
FIG. 1 is a plan view of an optical disk, according to an embodiment of the present invention, as viewed from a label surface of the optical disk.

FIG. 1 is a plan view of the optical disk 100 according to the present embodiment, as viewed from a label surface "LS" thereof. The optical disk 100 is, for instance, such a visible image recordable disk in which an image can be drawn on a side of a label surface LS of a general-purpose disk. In the present embodiment, it is assumed that the optical disk 100 is a DVD-R, but may be alternatively realized as such an optical disk as a CD-R, and the like.

As indicated in FIG. 1, the optical disk 100 includes: an information area 102 (areas having radius of 22 mm to 24 mm); an automatic adjusting area 103 (areas having radius of 24 mm to 25 mm); and a drawing area 104 (areas having radius of 25 mm to 58.2 mm) on the side of the label surface LS from a center hole 101 of the optical disk 100 toward an outer circumference thereof. Information about the optical disk 100 and the like are stored in the information area 102. When a focus servo gain adjustment is carried out, laser light is irradiated onto the automatic adjusting area 103. An image is drawn on the drawing area 104. It should be understood that in the present embodiment, since a structure of the automatic adjusting area 103 is identical to a structure of the drawing area 104, the automatic adjusting area 103 may be drawn, but has been discriminated as an area which is not drawn.

Figure 2:
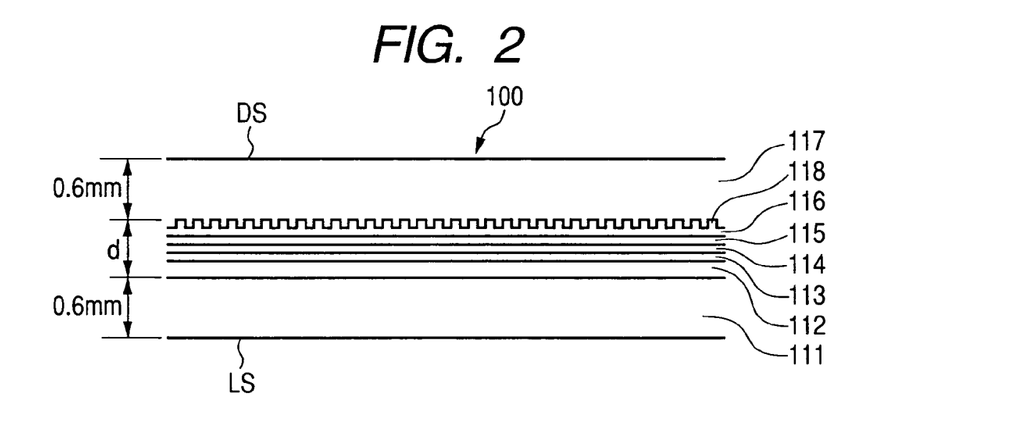
FIG. 2 is a sectional view of either a drawing area or an automatic adjusting area of the optical disk according to the embodiment.

FIG. 2 is a sectional view for showing both the automatic adjusting area 103 and the drawing area 104 of the optical disk 100. As shown in FIG. 2, the sectional structure of the optical disk 100 is formed by sequentially arranging a polycarbonate layer 111, a drawing layer 112, a reflection layer 113, an adhesive layer 114, another reflection layer 115, a data recording layer 116, and another polycarbonate layer 117 from the label surface LS toward a recording surface "DS." While a thickness of the optical disk 100 is approximately 1.2 mm, each of the polycarbonate layer 111 and the polycarbonate layer 117 occupies approximately 0.6 mm, so that a thickness from the drawing layer 112 up to the data recording layer 116 is a very short distance of "d", as compared with the entire thickness of approximately 1.2 mm. A helical-shaped groove (guide groove) 118 is formed on a side of a recording surface "DS" of the data recording layer 116.

The drawing layer 112 and the data recording layer 116 are coloring matter layers formed by a substance which is discolored when laser light having strength higher than, or equal to a predetermined strength is irradiated onto the coloring matter layers. When a drawing operation is carried out, laser light is focused onto the drawing layer 112 based upon reflection light from the reflection layer 113. Then, when the laser light having the strength higher than, or equal to the predetermined strength, an area of the drawing layer 112 onto which the laser light is irradiated is discolored. An image which can be visually recognized by a user is formed by the discolored area and another area which is not disclosed. Similarly, when a data recording operation is carried out, laser light is focused onto the data recording layer 116 based upon reflection light from the reflection layer 115 so as to record data along the groove 118. In the case that recorded data is read out, a laser light having a strength lower than a predetermined strength which is lower than that of the data recording operation is irradiated along the groove 118, and then, strengths of reflection light are sensed so as to realize the data recording operation.

Figure 3:
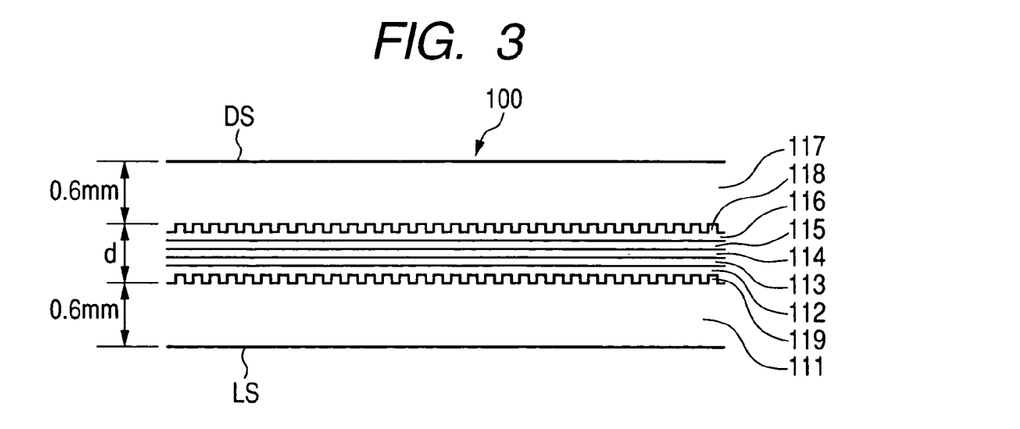
FIG. 3 is a sectional view of an information area of the optical disk according to the embodiment.

FIG. 3 is a sectional view for showing the information area 102 of the optical disk 100. As indicated in FIG. 3, in addition to the sectional structures of the automatic adjusting area 103 and the drawing area 104 of the above-described optical disk 100, a pre-pit 119 is formed on the side of the label surface LS of the drawing area 112. Data which indicates that the optical disk 100 is a visible image recordable disk capable of drawing on the side of a label surface thereof has been recorded on the pre-bit 119.

Figure 4:
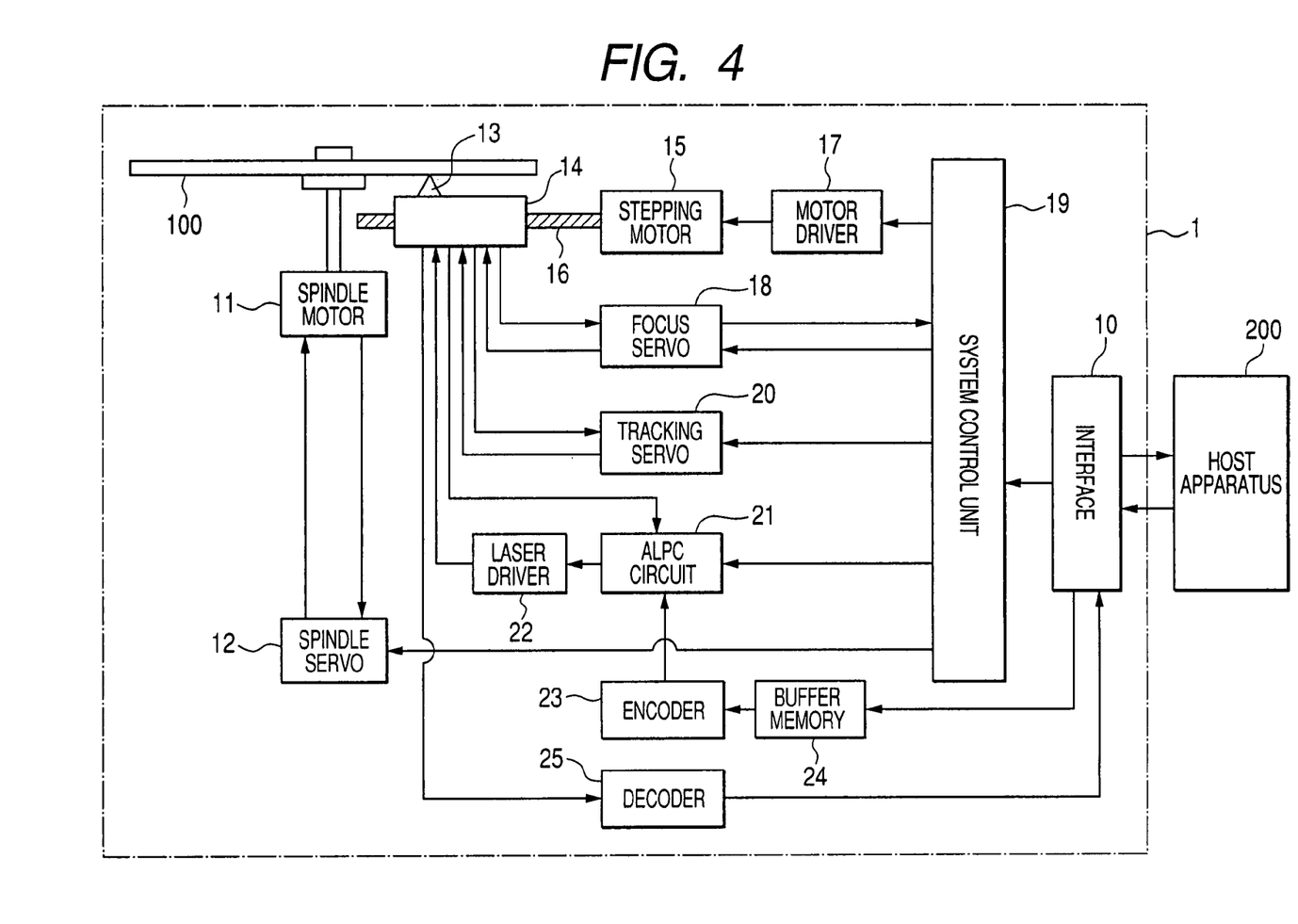
FIG. 4 is a block diagram for showing an arrangement of an optical disk drawing apparatus according to the embodiment.

Next, a description is made of the optical disk drawing apparatus 1, FIG. 4 is a block diagram for showing an arrangement of the optical disk drawing apparatus 1 in the case that the optical disk 100 is loaded on the optical disk drawing apparatus 1.

In the optical disk drawing apparatus 1, the optical disk 100 is rotated by a spindle motor 11. A spindle servo 12 controls rotations of the spindle motor 11 in such a manner that a linear velocity is constant (namely, CLV control) when both a recording operation and a reproducing operation are carried out, where as a rotation number thereof is constant (namely, CAV control) when a drawing operation is carried out. An optical pickup 14 is transported by a feeding mechanism 16 along a radial direction (right and left directions, as viewed in this drawing) of the optical disk 100 so as to irradiate laser light 13 onto the optical disk 100. The feeding mechanism 16 is constructed of a feeding screw and the like, which is driven by a stepping motor 15. Then, a light reception signal produced based upon reflection light reflected from the optical disk 100 is output to respective circuits of the optical disk drawing apparatus 1. A motor driver 17 drives the stepping motor is in response to an instruction of a system control unit 19. Since the system control unit 19 has stored thereinto the area of the automatic adjusting area 103, the system control unit 19 can judge whether or not a present position corresponds to such a position where the laser light 13 from the optical pickup 14 is to be irradiated onto the automatic adjusting area 103.

A focus servo 18 performs a focus servo control during a data recording operation, a reproducing operation, and a drawing operation in order to control a focus position of an objective lens of the optical pickup 14. A detailed operation of the focus servo 18 will be described later.

A tracking servo 20 performs a tracking servo control of the optical pickup 14 based upon an instruction issued from the system control unit 19 and the light reception signal from the optical pickup 14 when the data recording operation and the reproducing operation are carried out. It should be noted that the tracking servo control is turned off when the drawing operation is carried out. An ALPC (Automatic Laser Power Control) circuit 21 controls strength of the laser light 13 when a laser driver 22 drives a laser diode of the optical pickup 14 during the data recording operation, the reproducing operation, and the drawing operation in response to both the instruction issued from the system control unit 19, and the light reception signal derived from the optical pickup 14.

An encoder 23 encodes recording data to obtain a format in accordance with the type of the optical disk 100 when the data recording operation is carried out. In the present embodiment, since the type of the optical disk 100 is a DVD-R, the encoder 23 performs an 8-to-16 modulating operation. The laser driver 22 modulates the laser light 13 in response to the encoded recording data, and records the encoded recording data by discoloring the data recording layer 116 of the optical disk 100. On the other hand, when the drawing operation is carried out, the encoder 23 produces a pulse signal (will be referred to as "drawing signal" herein after), the duty ratio of the pulse signal being changed in response to gradation data of a pixel which constitutes drawing data. The laser driver 22 modulates the laser light 13 based upon the drawing signal so as to perform a drawing operation based on monochromatic multi-gradation by discoloring the drawing layer 112 of the optical disk 100. A decoder 25 performs an 8-to-16 demodulating operation with respect to the light reception signal derived from the optical pickup 14 so as to reproduce data, and then, transmits the reproduced data via an interface 10 to a host apparatus 200 during the data reproducing operation.

The host apparatus 200 transmits an instruction so as to cause the optical disk drawing apparatus 1 to perform any one of the data recording operation, the data reproducing operation, and the drawing operation. Also, the host apparatus 200 transmits an instruction issued from an operator to the optical disk drawing apparatus 1. The instruction is transmitted via the interface 10 to the system control unit 19. The system control unit 19 executes corresponding operations with respect to the respective circuits of the optical disk drawing apparatus 1 in response to the transmitted instruction. The host apparatus 200 stores either drawing data of an image or recording data via the interface 10 into a buffer memory 24. The drawing data of the image is drawn in the drawing layer 112 formed on the side of the label surface LS of the optical disk 100, whereas the recording data is recorded on the data recording layer 116 formed on the side of the recording surface DS thereof. Either the drawing data or the recording data is once stored in the buffer memory 24, and thereafter, is read therefrom so as to be supplied to the encoder 23.

Figure 5:
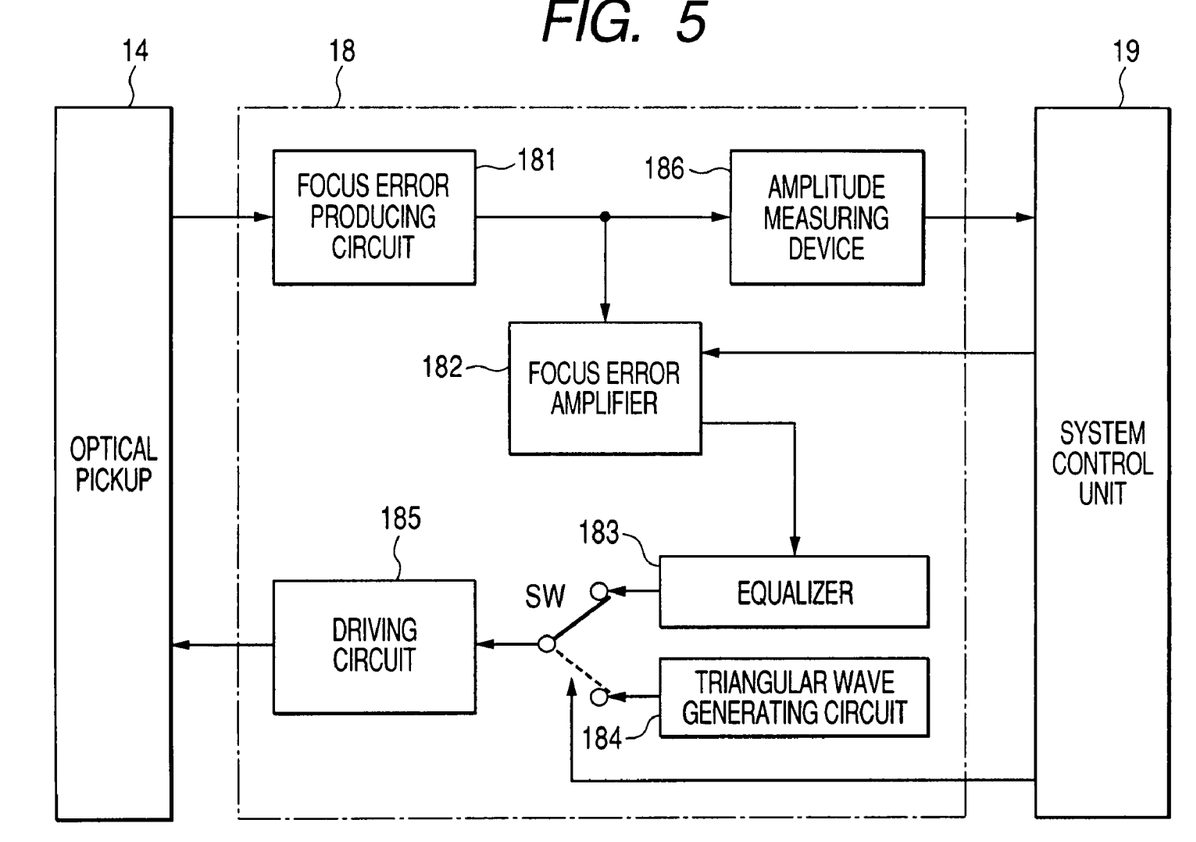
FIG. 5 is a block diagram for showing an arrangement of a focus servo control employed in the optical disk drawing apparatus according to the embodiment.

Next, a description is made of an arrangement of the above-described focus servo 18. FIG. 5 is a block diagram for showing the arrangement of the focus servo 18. A focus error producing circuit 181 produces a focus error signal in response to a light reception signal output from the optical pickup 14. A focus error amplifier 182 is a gain control circuit which controls a gain of a focus error signal based upon a focus servo gain, and sets the focus servo gain required to perform a stable focus servo control under control of the system control unit 19. An equalizer 183 performs a phase compensating operation with respect to the focus error signal whose gain has been set by the focus error amplifier 182, and then, outputs the phase-compensated focus error signal as a focus error control signal. A triangular wave generating circuit 184 is a circuit for outputting a triangular wave signal. A loop switch SW is a switch which is operated in order that any one of the focus error control signal output from the equalizer 183 and the triangular wave signal output from the triangular wave generating circuit 184 is entered to a driving circuit 185. The driving circuit 185 moves the objective lens of the optical pickup 14 in response to the entered signal. Concretely speaking, when the input signal is the focus error control signal, the driving circuit 185 controls the optical pickup 14 in such a manner that the objective lens of the optical pickup 14 is moved along a direction capable of canceling a focus error, namely, the objective lens is focused onto the drawing layer 112 during the drawing operation. When the input signal is the triangular wave signal, the driving circuit 185 controls the optical pickup 14 in such a manner that the focal position of the objective lens is vibrated based upon the waveform of the triangular wave signal. An amplitude measuring device 186 detects amplitude of the focus error signal and outputs the detected amplitude to the system control unit 19.

Figure 6:
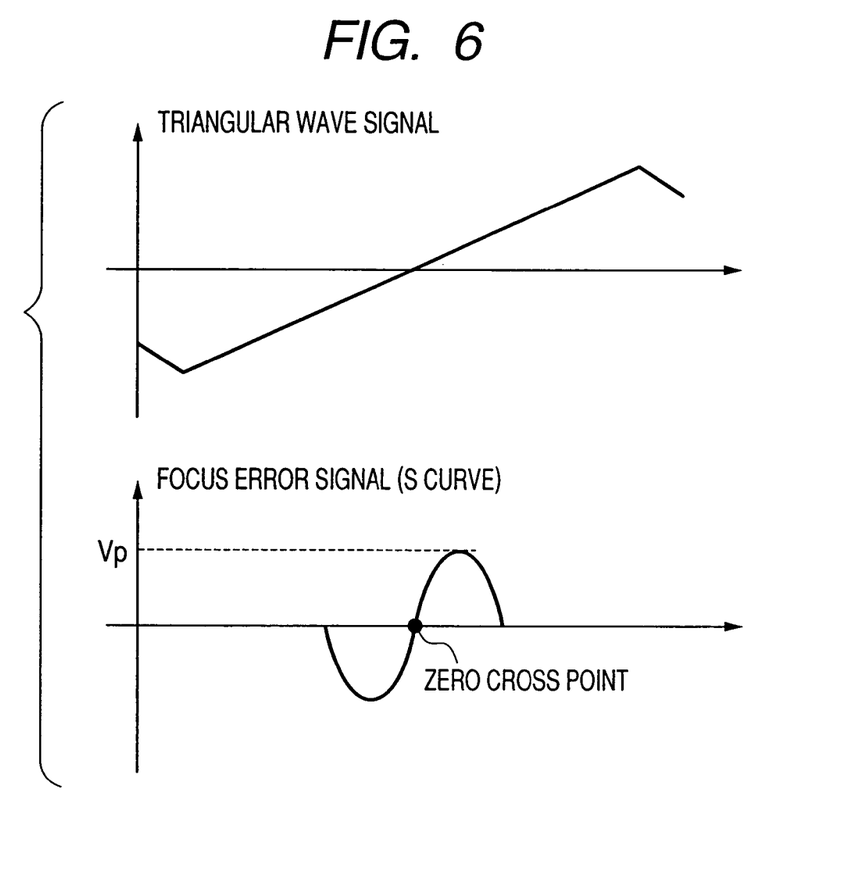
FIG. 6 is an explanatory diagram for explaining signals in the focus servo control.

Referring now to FIG. 4, FIG. 5, and FIG. 6, a description is made of operations in such a case that the optical disk drawing apparatus 1 draws on the optical disk 100. Firstly, the host apparatus 200 transmits both an instruction and drawing data with respect to the interface 10 of the optical disk drawing apparatus 1 in order to perform a drawing operation for the optical disk 100. The interface 10 outputs the instruction transmitted from the host apparatus 200 to the system control unit 19, and stores the drawing data in the buffer memory 24.

Subsequently, the optical disk 100 is loaded on the optical disk drawing apparatus 1. When the optical disk 100 is loaded, the spindle motor 12 is controlled by the system control unit 19 in order that the rotation speed of the spindle motor 11 is controlled to become constant (namely, CAV control). Then, the system control unit 19 controls the motor driver 17 in such a manner that the stepping motor 15 causes the feeding mechanism 16 to move the position of the optical pickup 14 so as to locate such a position where the laser light 13 is to be irradiated to the automatic adjusting area 103 of the optical disk 100. This control condition may be judged based upon the move distance of the optical pickup 14. The system control unit 19 controls the ALPC circuit 21 in order that strength of the laser light 13 becomes equal to such strength during the reproducing operation (namely, strength of laser light 13 by which drawing layer 112 is not discolored). Then, the tracking servo 20 is controlled to be turned off by the system control unit 19.

Next, a setting operation of a focus servo gain with respect to the focus error amplifier 182 of the focus servo 11 will now be explained with reference to FIG. 5 and FIG. 6. Firstly, the system control unit 19 switches the loop switch SW to such a switching mode as indicated by a broken line of FIG. 5 so as to connect the triangular wave generating circuit 184 to the driving circuit 185. Then, such a triangular wave signal as shown in FIG. 6 is entered to the driving circuit 185. As a result, the driving circuit 165 performs a control operation as follows: That is, the objective lens of the optical pickup 14 is moved close to, or separated from the optical disk 100 at a constant speed so as to change the position of the focal point, so that the focal point of the objective lens passes through the drawing layer 112.

As represented in FIG. 6, a focus error signal is changed in an S-shaped form (will be referred to as "S curve" herein after) before and after the focal point of the objective lens is focused on the drawing layer 112. At this time, at timing when the S curve crosses a zero point, the focal point of the objective lens is under just focusing condition with respect to the drawing layer 112. Then, the focus error signal is output to the amplitude measuring device 186, so that the amplitude measuring device 186 measures an amplitude of the S curve and outputs the measured amplitude to the system control unit 19. In this case, it is so assumed that a peak voltage of the amplitude of the S curve is "Vp."

Next, the system control unit 19 sets the focus servo gain of the focus error amplifier 182 in such a manner that a peak voltage of an amplitude of the focus error signal which is output from the focus error amplifier 182 becomes a predetermined voltage "Vc", while the gain of the focus error signal has been controlled. In other words, the system control unit 19 sets the focus servo gain so that the focus error amplifier 182 amplifies the focus error signal by multiplied by Vc/Vp.

Then, the system control unit 19 switches the loop switch SW to such a switching mode as indicated by a solid line of FIG. 5 so as to connect the equalizer 183 to the driving circuit 185. As a result, in the focus servo 18, a focus loop is constructed in conjunction with the optical pickup 14. Then, the system control unit 19 continuously controls the position of the objective lens of the optical pickup 14 based upon a light reception signal derived from the optical pickup 14 during a drawing operation by performing a feedback control operation in order that the focal point of the objective lens is focused on the drawing layer 112. The setting operation of the focus servo gain performed in the focus servo 18 has been explained.

Referring back to FIG. 4, a description as to the drawing operation with respect to the optical disk 100 will be continued. The system control unit 19 controls the motor driver 17 in order that the stepping motor 15 moves the position of the optical pickup 14 by driving the feeding mechanism 16, so that the position where the laser light 13 is irradiated is located in the drawing area 104 of the optical disk 100. This positioning control may be judged based upon the travel distance of the optical pickup 14. Also, the system control unit 19 controls the ALPC circuit 21 in such a manner that strength of the laser light 13 may become a strength for the drawing operation (namely, strength of laser light 13 by which drawing layer 112 is discolored). The drawing data which have been stored in the buffer memory 24 are sequentially read out therefrom, and the encoder 23 produces drawing signals from the read drawing data and then outputs the produced drawing signals to the ALPC circuit 21. The ALPC circuit 21 modulates the laser light 13 based upon the drawing signals, and controls the laser driver 22 in such a manner that an image is drawn on the optical disk 100. As previously described, the optical disk drawing apparatus 1 may perform a desirable drawing operation with respect to the optical disk 100.

At this time, in such a case that after the drawing operation has been carried out with respect to the drawing layer 112 of the optical disk 100, an additional drawing operation is wanted to be furthermore carried out, the advantage of the present embodiment can be considerably achieved. In other words, in the conventional optical disk drawing apparatus, since the item which has already been drawn on the optical disk is the image, the image-recorded area and the image-unrecorded area are frequently changed. As a result, the reflection light of the laser light 13 is not stable, so that the focus servo gain can be hardly controlled in the correct manner. However, as previously explained in the present embodiment, the automatic adjusting area 103 where the drawing operation is not carried out is provided in the optical disk 100, and the laser light 13 is irradiated onto the formed automatic adjusting area 103 so as to control the focus servo gain, thereby the stable focus servo control can be carried out.

While the embodiment of the present invention has been described the present invention may be alternatively embodied in the following various modes.

Modification 1

In the above-described embodiment, as shown in FIG. 1, the automatic adjusting area 103 has been previously provided between the information area 102 and the drawing area 104. Alternatively, the automatic adjusting area 103 can be formed at an arbitrary place of the optical disk 100, for example, can be provided in the vicinity of the outermost circumferential portion thereof. In this alternative case, the information as to the automatic adjusting area 103, which is stored in the information area 102, is read, so that the system control unit 19 can recognize this automatic adjusting area 103 based upon the read information. Also, the information of the automatic adjusting area 103 may be output from the host apparatus 200 to the system control unit 19 based upon an operation of the operator, and then, the system control unit 19 recognizes the automatic adjusting area 103 by receiving the output information. It should also be understood that as to the width of the automatic adjusting area 103, any sizes of widths may be alternatively employed as long as a width capable of controlling the focus servo gain is secured. In this alternative width case, a freedom degree of such an area capable of drawing an image can be increased.

Modification 2

Figure 7:
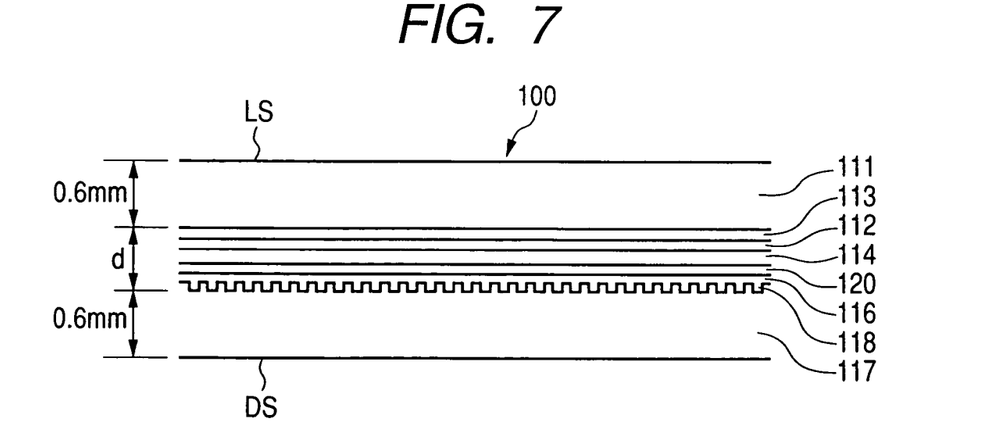
FIG. 7 is a sectional view of either a drawing area or an automatic adjusting area of an optical disk according to a modification 2.

In the above-described embodiment, when the drawing operation is carried out on the drawing layer 112, the laser light 13 can be irradiated from the side of the label surface LS. Alternatively, the laser light 13 may be irradiated from the side of the recoding surface DS so as to draw the drawing layer 112. In this alternative case, as indicated in FIG. 7, a sectional structure of the drawing area 104 of the optical disk 100 is realized by sequentially arranging the polycarbonate layer 111, the reflection layer 113, the drawing layer 112, the adhesive layer 114, a semi-transparent reflection layer 120, the data recording layer 116, and the polycarbonate layer 117 along a direction from the label surface LS toward the recording surface DS. In this alternative case, a difference between the above-described alternative optical disk and the optical disk 100 shown in FIG. 2 is a positional relationship of the reflection layer 113. Then, in this alternative optical disk, the focus servo 18 may be controlled under control of the system control unit 19 in such a manner that the focal point of the objective lens of the optical pickup 14 is focused on the data recording layer 116 when the data reproducing operation and the data recording operation are carried out, whereas this focal point is focused on the drawing layer 112 when the image drawing operation is carried out.

Modification 3

In the above-described embodiment, no drawing operation has been carried out with respect to the automatic adjusting area 103 of the optical disk 100. Alternatively, in the case that such a data to be drawn in the automatic adjusting area 103 has been contained in the drawing data transmitted from the host apparatus 200 during the drawing operation, the encoder 23 rewrites this data into such a drawing data which is not written in the automatic adjusting area 103, and thereafter, produces a drawing signal. In this alternative rewriting operation of the drawing data, the drawing data is rewritten in such a manner that an image to be positioned in the automatic adjusting area 103 is deleted. Also, the drawing data may be alternatively rewritten in such a manner that magnification of this image is changed so as to store the image within the drawing area 104, so that the image is not present in the automatic adjusting area 103. In these alternative cases, even when the drawing data transmitted from the host apparatus 100 corresponds to such a data to be drawn in the automatic adjusting area 103, the drawing operation for the automatic adjusting area 103 may not be permitted by the optical disk drawing apparatus 1.

Modification 4

Figure 8:
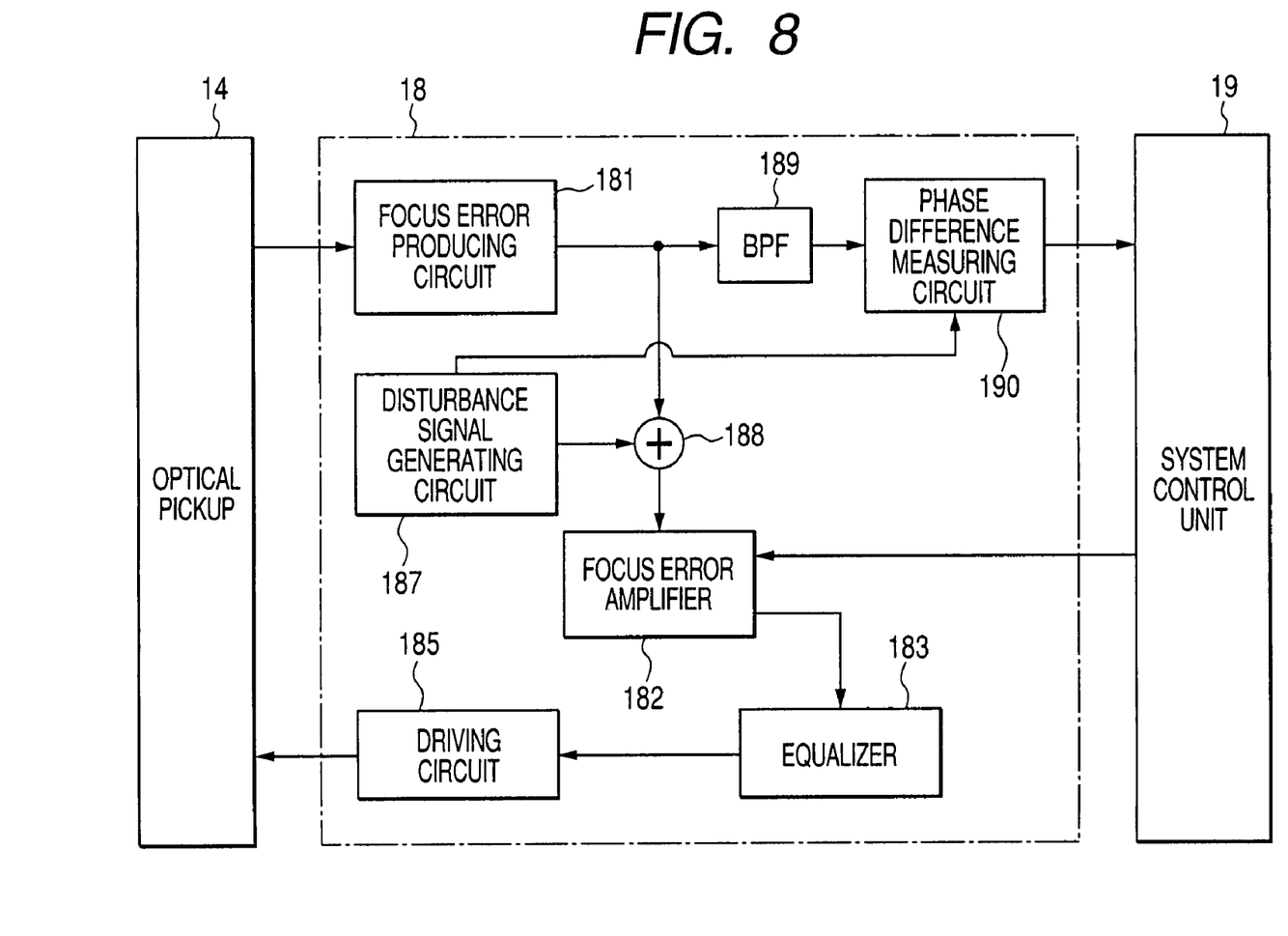
FIG. 8 is a block diagram for showing an arrangement of a focus servo control employed in an optical disk drawing apparatus according to a modification 4.

In the above-described embodiment, the focus servo 18 has employed such an arrangement as shown in FIG. 5. Alternatively, even when the focus servo 18 may employ another arrangement as represented in FIG. 8, this focus servo 18 may control the focus servo gain in a stable manner. A description is made of the alternative arrangement shown in FIG. 8 employed in the focus servo 18. It should also be understood that the same reference numerals shown in FIG. 5 will be employed as those for denoting the same structural elements indicated in FIG. 8, and therefore, detailed descriptions thereof will be omitted. A disturbance signal generating circuit 187 generates a disturbance signal having a frequency of several KHz. Then, the generated disturbance signal is injected via an adder 188 into a focus error signal output from the focus error producing circuit 181, and thereafter, the added focus error signal is output to the focus error amplifier 182. Then, the equalizer 183 produces a focus error control signal based upon the focus error signal into which the disturbance signal has been injected. Then, the driving circuit 185 controls the optical pickup 14 based upon the produced focus error control signal. A light reception signal output from the optical pickup 14 is entered to the focus error producing circuit 181, so that the loop is circulated. A BPF (bandpass filter) 189 derives the disturbance signal component from the focus error signal which has been circulated within the loop, and a phase difference measuring circuit 190 measures a phase difference between the disturbance signal output from the disturbance signal generating circuit 187, and the disturbance signal derived from the focus error signal. Then, the system control unit 19 sets the focus servo gain of the focus error amplifier 183 in order to become a predetermined phase difference. As previously described, even when any type of focus servo has the above-described arrangement which is different from that of the above-explained embodiment, if such a focus servo control employs a method capable of irradiating the laser light 13 onto the automatic adjusting area 103 and capable of controlling a focus servo gain based upon a light reception signal output from the optical pickup 14, then a similar advantage to that of the above-described embodiment may be achieved in any types of focus servo control arrangements.

What is claimed is:

1. An optical disk drawing apparatus for drawing an image on a drawing layer formed in an optical disk, the apparatus comprising:

a rotating unit that rotates the optical disk;

an optical pickup that irradiates laser light onto the optical disk and produces a light reception signal based on reflection light reflected from the optical disk;

a feeding unit that relatively moves the optical pickup with respect to the optical disk;

a focus servo controller that sets a focus servo gain, controls a gain of a signal produced based on the light reception signal according to the set focus servo gain and perform a focus servo control so that a focal point of the laser light output from the optical pickup is focused on the drawing layer based on the gain-controlled signal;

a judging unit that detects a position of the optical pickup moved by the feeding unit and judges whether or not an irradiation position of the laser light from the optical pickup is located within an adjusting area, the adjusting area being a predetermined area on the drawing layer formed on the optical disk; and a drawing controller that causes the focus servo control to set the focus servo gain when a judgment result made by the judging unit is positive, and thereafter permit a drawing operation of irradiating the laser light onto the drawing layer to form the image on the drawing layer in the event that the focus servo gain has been set by the focus servo controller and the judgment result made by the judging unit is negative.

2. The apparatus according to claim 1, wherein the judging unit stores area data indicative of the predetermined area, and compares the stored area data and the detected position of the optical pickup for the judging operation.

3. The apparatus according to claim 1, wherein
the judging unit includes a reception unit that receives area data indicative of the predetermined area, and
the judging unit compares the area data received by the reception unit and the detected position of the optical pickup for the judging operation.

4. The apparatus according to claim 1, wherein
the judging unit includes a readout unit that reads area data indicative of the predetermined area from the light reception signal output by the optical pickup; and
the judging unit compares the area data read by the readout unit and the detected position of the optical pickup for the judging operation.

5. The apparatus according to claim 1 further comprising:
a storage that stores drawing data indicative of the image;
a drawing judging unit that judges whether or not the image data is to be drawn in the predetermined area of the optical disk; and
a rewriting unit that corrects the image data so that the corrected image data is not drawn in the predetermined area when a judgment result made by the drawing judging unit is positive.

6. A method of drawing an image on a drawing layer formed in an optical disk, the method comprising:
rotating the optical disk;
irradiating laser light onto the optical disk to produce a light reception signal based on reflection light reflected from the optical disk;
first relatively moving the optical pickup with respect to the optical disk so that an irradiation position of the laser light from the optical pickup is located within a predetermined area on the optical disk;
after the first moving, setting a servo control gain;
after the setting, second relatively moving the optical pickup with respect to the optical disk so that the irradiation position of the laser light from the optical pickup is not located within the predetermined area on the optical disk;

after the second moving, controlling a gain of a signal produced based on the light reception signal according to the set focus servo gain and performing a focus servo control so that a focal point of the laser light output from the optical pickup is focused on the drawing layer based on the gain-controlled signal;
after the controlling, permitting a drawing operation of irradiating the laser light onto the drawing layer to form the image on the drawing layer.

7. An optical disk drawing system comprising:
an optical disk including a drawing layer in which an image is to be drawn;
a rotating unit that rotates the optical disk;
an optical pickup that irradiates laser light onto the optical disk and produces a light reception signal based on reflection light reflected from the optical disk;
a feeding unit that relatively moves the optical pickup with respect to the optical disk;
a focus servo controller that sets a focus servo gain, controls a gain of a signal produced based on the light reception signal according to the set focus servo gain, and performs a focus servo control so that a focal point of the laser light output from the optical pickup is focused on the drawing layer based on the gain-controlled signal;
a judging unit that detects a position of the optical pickup moved by the feeding unit and judges whether or not an irradiation position of the laser light from the optical pickup is located within a predetermined area on the optical disk; and
a drawing controller that causes the focus servo control to control the focus servo gain when a judgment result made by the judging unit is positive, and permit a drawing operation of irradiating the laser light onto the drawing layer to form the image when the focus servo gain has been set by the focus servo controller and the judgment result made by the judging unit is negative.

8. The system according to claim 7, wherein
the optical disk includes an automatic adjusting area as the predetermined area of the optical disk and a drawing area where the image is drawn, and
a structure of the automatic adjusting area is identical to a structure of the drawing area.

9. The system according to claim 8, wherein
the optical disk includes a data recording layer for recording data,
a groove is formed on the data recording layer.

10. The system according to claim 9 further comprising a tracking servo that performs a tracking servo control is performed for the data recording layer having the groove when the data is recorded in the data recording layer, and does not perform the tracking servo control for the drawing layer having no groove when the image is drawn in the drawing layer.

* * * * *